United States Patent
Dew (10) Patent No.: US 10,404,145 B2
(45) Date of Patent: Sep. 3, 2019

(54) STATOR WINDING GUN HEAD

(71) Applicant: WGE Equipment Solutions LLC, Fort Wayne, IN (US)

(72) Inventor: Daniel C. Dew, Fort Wayne, IN (US)

(73) Assignee: WGE Equipment Solutions LLC, Fort Wayne, IN (US)

( * ) Notice: Subject to any disclaimer, the term of this patent is extended or adjusted under 35 U.S.C. 154(b) by 204 days.

(21) Appl. No.: 15/461,728

(22) Filed: Mar. 17, 2017

(65) Prior Publication Data

US 2017/0271966 A1 Sep. 21, 2017

Related U.S. Application Data

(60) Provisional application No. 62/310,252, filed on Mar. 18, 2016.

(51) Int. Cl.
*H02K 15/085* (2006.01)
*H02K 15/095* (2006.01)

(52) U.S. Cl.
CPC ......... *H02K 15/085* (2013.01); *H02K 15/095* (2013.01)

(58) Field of Classification Search
CPC ........................... H02K 15/085; H02K 15/095
See application file for complete search history.

(56) References Cited

U.S. PATENT DOCUMENTS

| | | | | |
|---|---|---|---|---|
| 2,770,424 A * | 11/1956 | Grove | ......... | H02K 15/085 242/432.3 |
| 3,334,825 A * | 8/1967 | Friedrich | ......... | H02K 15/085 242/432.4 |
| 4,991,782 A * | 2/1991 | Luciani | ......... | H02K 15/095 242/432.4 |
| 6,098,912 A * | 8/2000 | Noji | ......... | H02K 15/095 242/432.5 |
| 6,254,027 B1 * | 7/2001 | Kunou | ......... | H02K 15/095 242/432.4 |
| 6,749,144 B2 * | 6/2004 | Komuro | ......... | H02K 15/085 242/432.2 |
| 7,243,873 B2 * | 7/2007 | Noji | ......... | H02K 15/095 242/432 |
| 2004/0035974 A1 * | 2/2004 | Stratico | ......... | H02K 15/095 242/432.4 |
| 2005/0029385 A1 * | 2/2005 | Stratico | ......... | H02K 15/095 242/432.2 |
| 2009/0261194 A1 * | 10/2009 | Naitou | ......... | H02K 15/095 242/432 |
| 2012/0228421 A1 * | 9/2012 | Heffelfinger | ......... | H02K 15/095 242/432.5 |
| 2013/0233436 A1 * | 9/2013 | Ponzio | ......... | H02K 15/095 140/71 C |

* cited by examiner

*Primary Examiner* — Emmanuel M Marcelo
(74) *Attorney, Agent, or Firm* — Taylor IP, P.C.

(57) ABSTRACT

A wire winding gun head for winding conductive wiring to form electrical coils. The wire winding gun head having a body, a movable element and a needle. The body has a longitudinal axis. The movable element is coupled to the body, and the movable element has a profile therein. The needle is carried by the body, and the needle is extendable/retractable dependent upon the profile and a position of the movable element. The needle is configured to receive wire and to supply the wire out of an end of the needle.

18 Claims, 7 Drawing Sheets

STATOR WINDING GUN HEAD

CROSS REFERENCE TO RELATED APPLICATIONS

This is a non-provisional application based upon U.S. provisional patent application Ser. No. 62/310,252, entitled "STATOR WINDING GUN HEAD", filed Mar. 18, 2016, which is incorporated herein by reference.

BACKGROUND OF THE INVENTION

1. Field of the Invention

The present invention relates to a needle extension/retraction mechanism used in a stator winding gun head of a coil winding machine.

2. Description of the Related Art

An alternating current (AC) motor is an electric motor driven by AC that is typically supplied at a constant frequency. Varying frequency AC is also employed to vary the speed of some AC motors. The AC motor typically has two basic parts, an outside (often stationary) stator having coils arranged to produce a rotating magnetic field as the current is supplied thereto, and an inside rotor that often includes an output shaft. The rotor produces a second rotating magnetic field that interacts with the magnetic field of the stator to produce rotary motion of the output shaft. The magnetic field of the rotor may be produced by permanent magnets, reluctance saliency, or electrical windings.

Linear AC motors operate on similar principles as rotating motors but have their stationary and moving parts arranged in a straight line configuration, to thereby produce linear motion instead of rotational motion.

Depending on the configuration of the motor the stator may act as the field magnet, interacting with the rotor, which can be referred to as an armature in this example, to create motion. Or the stator may act as the armature, receiving its influence from moving field coils on the rotor. The first DC generators and DC motors put the field coils on the stator, and the power generation or motive reaction coils on the rotor. This configuration needs a continuously moving power switch, which has come to be called a commutator that is used to keep the magnetic fields correctly aligned across the spinning rotor. The stator can be either a permanent magnet or an electromagnet. Where the stator is configured as an electromagnet, the coils which energize the stator are collectively referred to as the field coil or the field winding.

In order to create a working stator a winding of insulated electrically conductive wire is used to form the stationary winding in the rotary or linear motor. The stator in an AC motor is also a wire coil, called a stator winding, which is built into the motor. When this coil is energized by AC power, a rotating magnetic field is produced. The stator windings are arranged to have a very low resistance and the winding is also electrically insulated from the frame of the motor. While motor stator windings have been discussed herein, the stator windings of the motor are identical to a generator armature that has a like amount of poles.

A needle winding machine is often used to feed the wire back into the crevices between ferrous pole members of the stator. The prior art needle winding machines have typically used a rotational mechanism to extend and retract the needle, with such an arrangement allowing up to 28% movement of the needle as compared to the body of the needle housing. This restricts the depth of the winding dimension, particularly when the rotor size is relatively small, for example when high magnetic strength magnets are used as part of the rotor design.

What is needed in the art is in an economic way in which the depth of movement of a needle in a needle coil winding machine is controllably extended and retracted to a greater degree than the prior art.

SUMMARY OF THE INVENTION

Embodiments of the present invention are for a needle extension apparatus for a stator coil winding gun head.

The invention in one form is directed to a wire winding gun head for winding conductive wiring to form electrical coils. The wire winding gun head having a body, a movable element and a needle. The body has a longitudinal axis. The movable element is coupled to the body, and the movable element has a profile therein. The needle is carried by the body, and the needle is extendable/retractable dependent upon the profile and a position of the movable element. The needle is configured to receive wire and to supply the wire out of an end of the needle.

The invention in another form is directed to a coil winding machine using a wire winding gun head for winding conductive wiring to form electrical coils. The wire winding gun head having a body, a movable element and a needle. The body has a longitudinal axis. The movable element is coupled to the body, and the movable element has a profile therein. The needle is carried by the body, and the needle is extendable/retractable dependent upon the profile and a position of the movable element. The needle is configured to receive wire and to supply the wire out of an end of the needle.

The invention in still yet another form is directed to a method of winding a coil onto a stator, the method includes the steps of: carrying a needle by a body of a wire winding gun head, the body extending in a longitudinal direction; pulling wire through the needle around a portion of the stator; and extending or retracting the needle dependent upon a profile slot in a movable element, the movable element being movable in the longitudinal direction.

Advantageously, the present invention provides for extended needle extension/retraction relative to the diameter of the body of the gun head.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
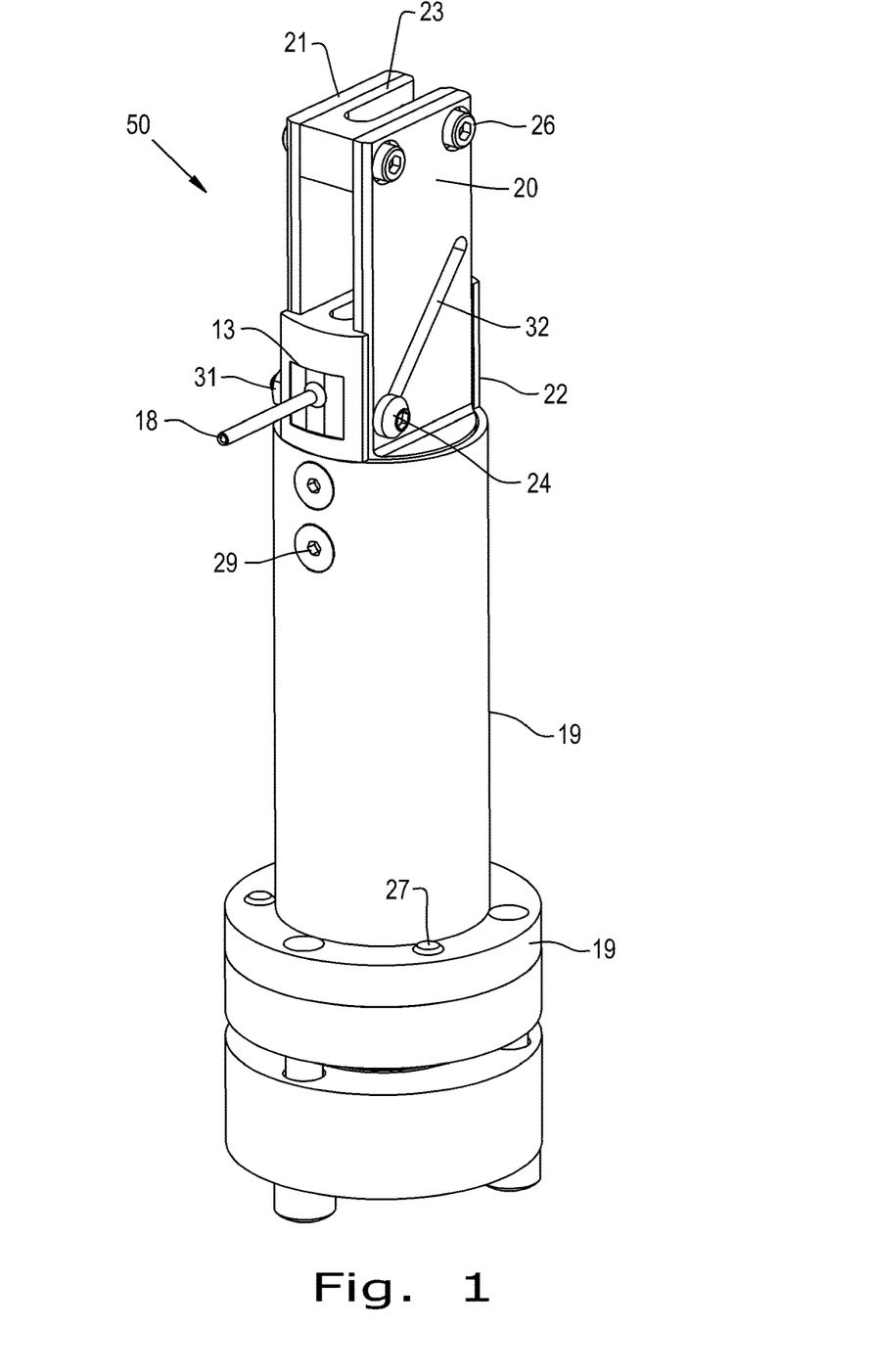
FIG. 1 is a perspective view of an embodiment of a winding gun head of the present invention.
Figure 2:
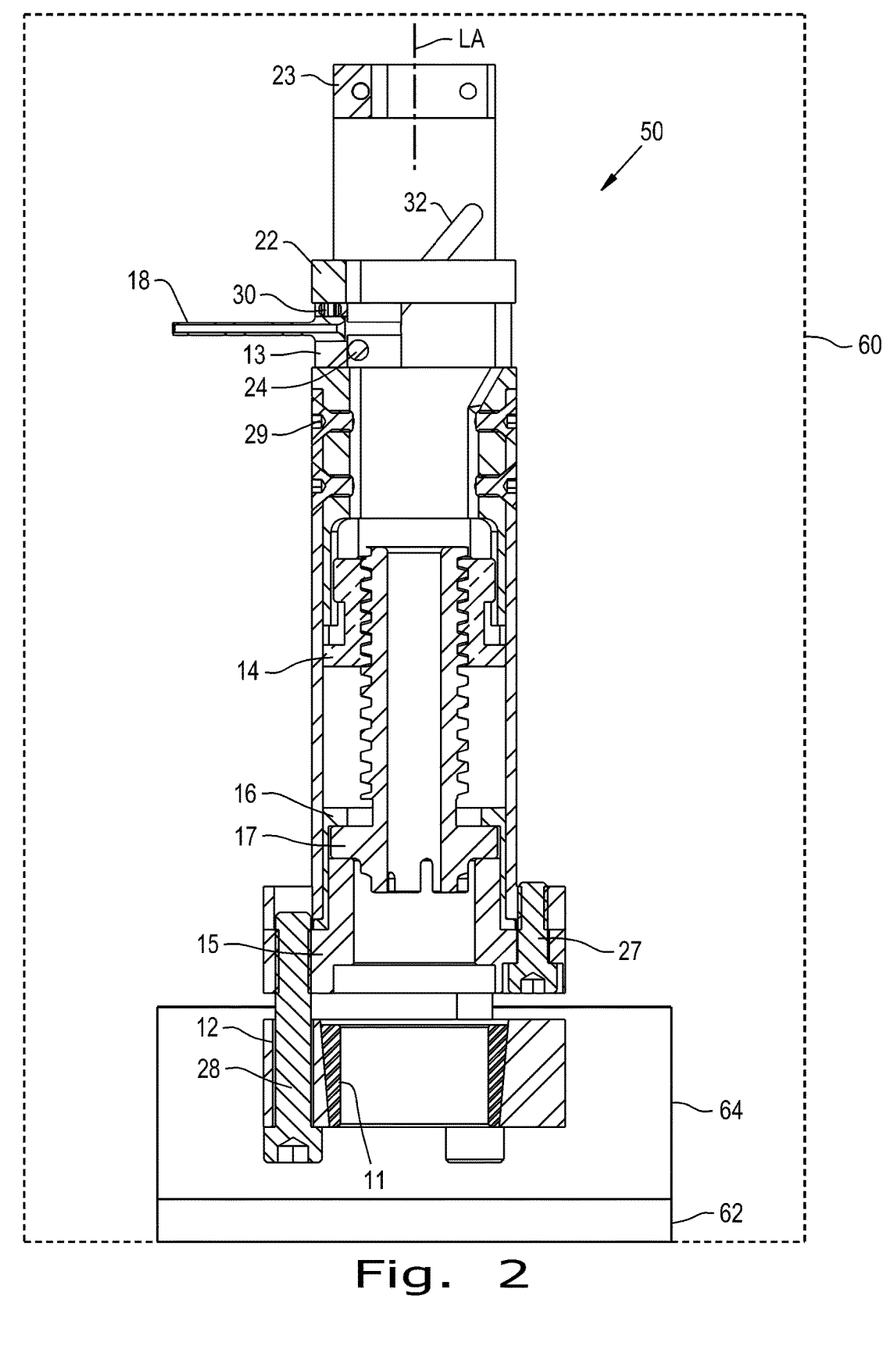
FIG. 2 is a partially sectioned side view of the gun head of FIG. 1, also schematically illustrating a coil winding machine that uses the gun head of FIG. 1.

Referring now to the drawings, and more particularly to FIGS. 1 and 2, there is shown a perspective view in FIG. 1, and a sectioned view in FIG. 2 of a gun head assembly 50 including a head clamp collet 11, a clamp ring 12, a needle carrier 13, a nut 14, a gun head mount 15, a cam retainer 16, a drive screw 17, a winding needle 18, a gun head body 19, a left plate 20, a right plate 21, a gun head frame 22, a bar 23, a screw 24, machine keys 25 and fastener parts 26-31. A slot 32 extends through plates 20 and 21, and screw 24 extends through both slots 32 and needle carrier 13.

This gun head 50 allows the needle 18 to travel more than twice as much as previous gun head designs allow within the same confines of a given outside body diameter. As a ratio of needle 18 movement to outside body diameter the present invention can move 57%. The previous state of the art gun head could move 28%. This inventive improvement is accomplished using a screw 17 to drive slotted vertical slides 20 and 21 that move vertically in gun head body 19. Vertical slides 20 and 21 create a translation of motion to the horizontally captive needle carrier 13 via slots 32 in vertical slides 20 and 21 and a cross bolt 24 in the needle carrier 13. This allows the needle carrier 13 to be horizontally translated across the entire distance of the inside of the gun head body 19. This translation of the vertical motion of slides 20 and 21 into horizontal motion of needle carrier 13 could also be altered in gear ratio, acceleration and/or dwell by changing the shape of the slots 32 in vertical slides 20 and 21 that cross bolt 24 follows.

Previous designs had a needle body that followed a slot in a spiral cam via a small dowel pin. This design was limited in overall motion because the spiral cam's slot can only travel as far as the center of the spiral. The center is also where the wire fed through the spiral cam so its overall motion was limited in this regard as well. In contrast to the prior art the present invention allows the wire to follow the complete translation of the needle carrier by way of a long slot in the gun head frame 22 and does not limit its travel to the center of the gun head body.

The present invention has a quick-change needle carrier 13 or needle body 13. By removing the cross bolt 24 from the needle carrier 13 the needle carrier 13 can be removed from the gun head 50 and the needle 18 can be changed to a different needle 18. The prior art gun heads required the removal of the entire top of the gun head to change a needle. The needle carrier 13 of the present invention itself is more robust and easier to make than the prior art. Needle carrier 13 is a square block with holes and slots cut in it. As explained above, the drive function is produced by cross bolt 24 that simply passes through a hole in needle carrier 13 and slots 32 in vertical slides 20, 21.

In the prior art the needle was driven by a dowel pin that followed a slot in a spiral cam. The dowel pin was pressed into the needle body then laser welded in place and then had the weld turned down so as to not produce any interference with the drive function of the spiral cam. The present invention eliminates these operations from the production of what are essentially consumable needles. Additionally the power transmission by way of cross bolt 24 is more robust. The previous drive pin was subject to breakage because it had to be so small to fit within the design package. The new cross bolt 24 design increases the cross sectional area, at the shear point of the drive function, which is greater by over four and a half times any similar structure of the prior art. This dramatically increases its strength and reduces a propensity for breakage as experienced with the prior art designs.

The outward functioning of inventive gun head 50 has been made similar to previous designs in terms of the overall outside envelope and its interfaces with the machine that drives gun head 50. This allows the ability of the present invention to be retrofit onto any legacy machine with no need for any additional modification.

It is contemplated that this new technology will be carried forward into future gun head designs of various sizes. Most particularly it can be carried over into smaller designs where moving needles were not previously possible.

The present invention advantageously has a modular design allowing the gun head to mimic a larger gun head by simply swapping out the needle carrier 13. A longer needle carrier 13 can ride in the gun head frame 22 allowing the gun head 50 to wind a much larger stator relative to its size than previous style gun heads. In the past, it would have required a different larger gun head and/or a much longer needle.

Figure 3:
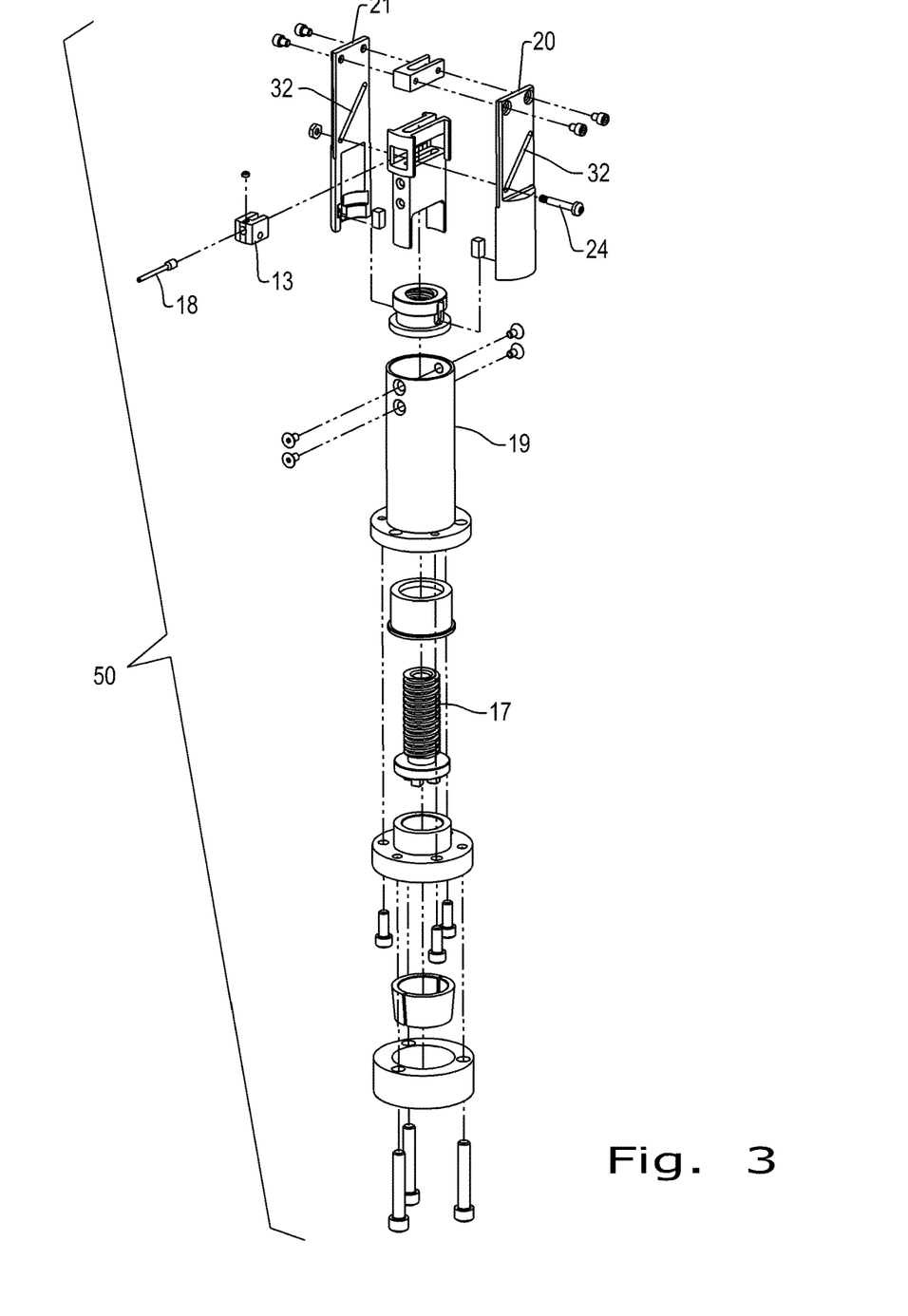
FIG. 3 is an exploded perspective view of the gun head of FIGS. 1 and 2.

Now, additionally referring to FIG. 3, there is shown an exploded view of gun head 50. This view illustrates the robust nature of the present invention.

Figure 4:
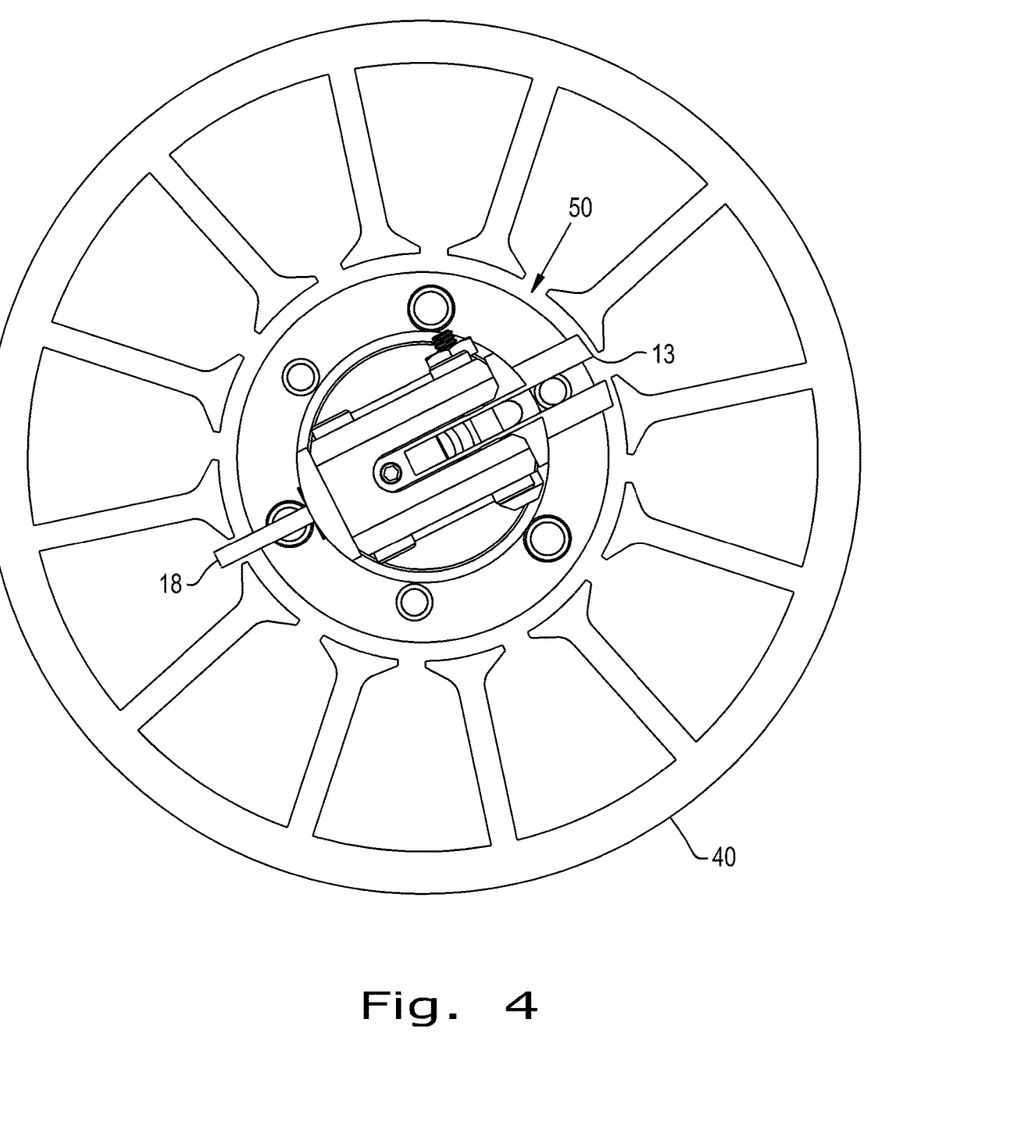
FIG. 4 is a top view of the gun head of FIGS. 1-3 shown in a stator bobbin.
Figure 5:
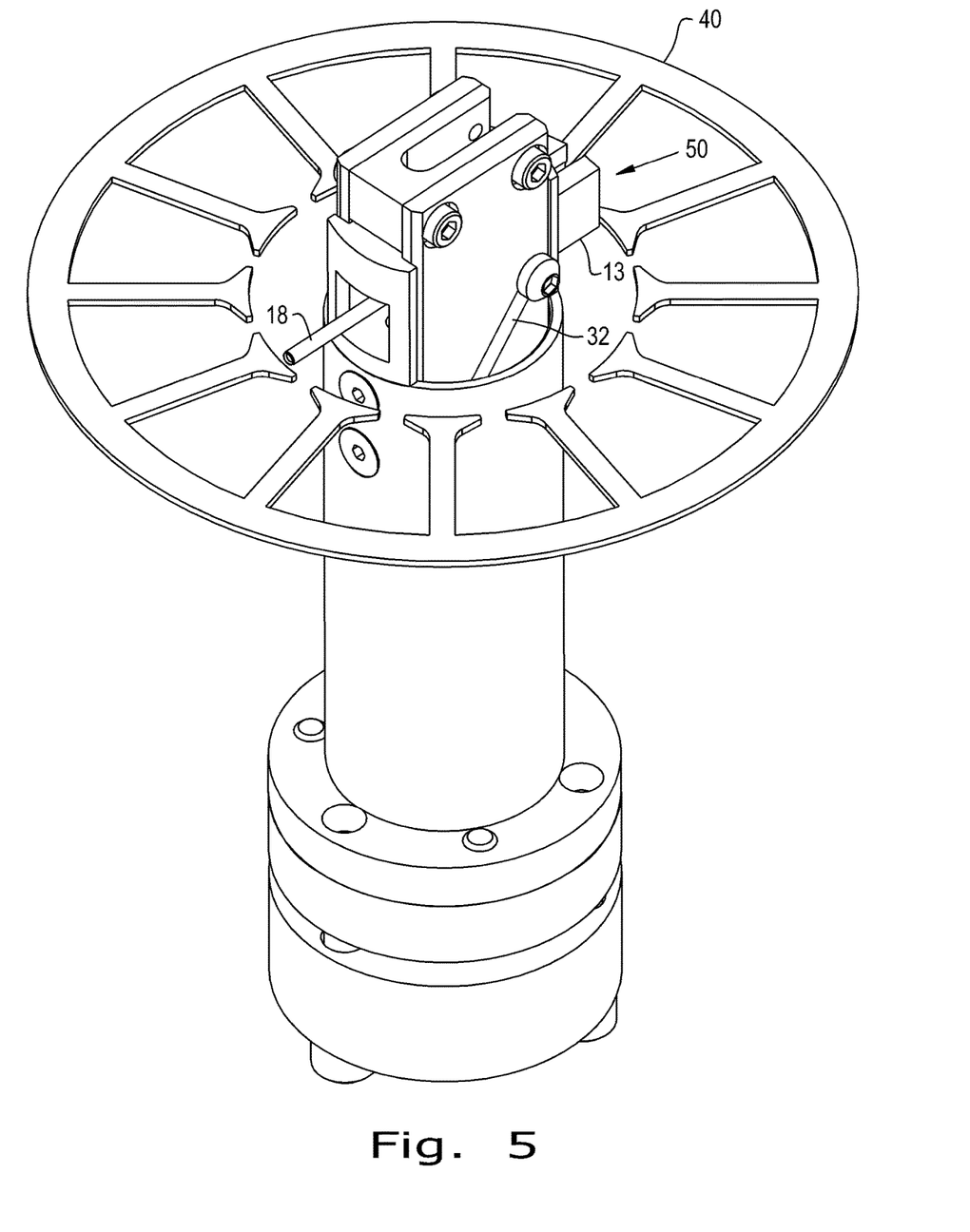
FIG. 5 is a perspective view of the gun head of FIGS. 1-4 again shown in the stator bobbin of FIG. 4.

Now additionally referring to FIGS. 4 and 5 there is respectively shown a top view and a perspective view of gun head 50 relative to a profile of a stator 40, with needle carrier 13 and needle 18 in a fully retracted position due to the position of plates 20 and 21. This position would then be the position as wire is wound onto stator 40 at its most inward position. Note only a thin representation of stator 40 is illustrated in FIGS. 5 and 7 to thereby allow more visibility of gun head 50 and to show how the invention operates and it is recognized that stator 40 will likely extend substantially more in the longitudinal direction than is shown in the figures.

Figure 6:
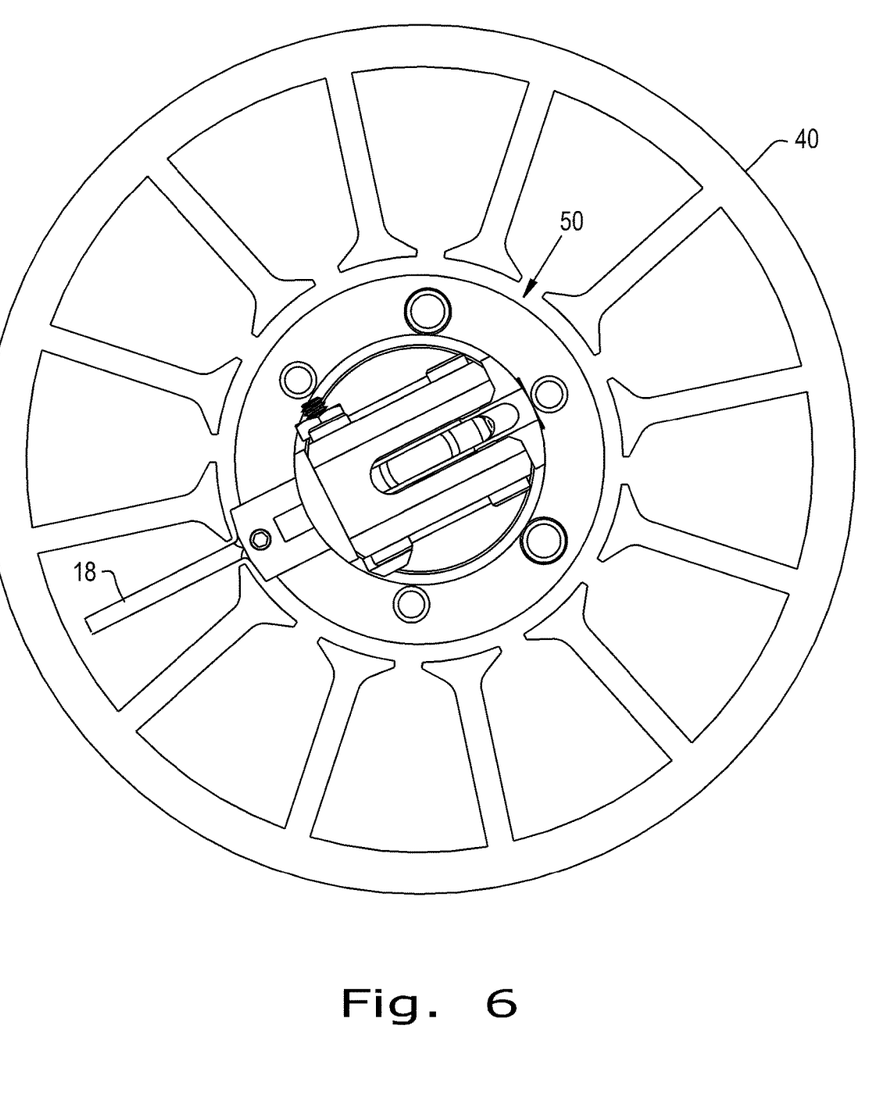
FIG. 6 is another top view of the gun head of FIGS. 1-5 again shown in the stator bobbin of FIGS. 4 and 5 with the needle extended to wind wire into the depth of the bobbin.
Figure 7:
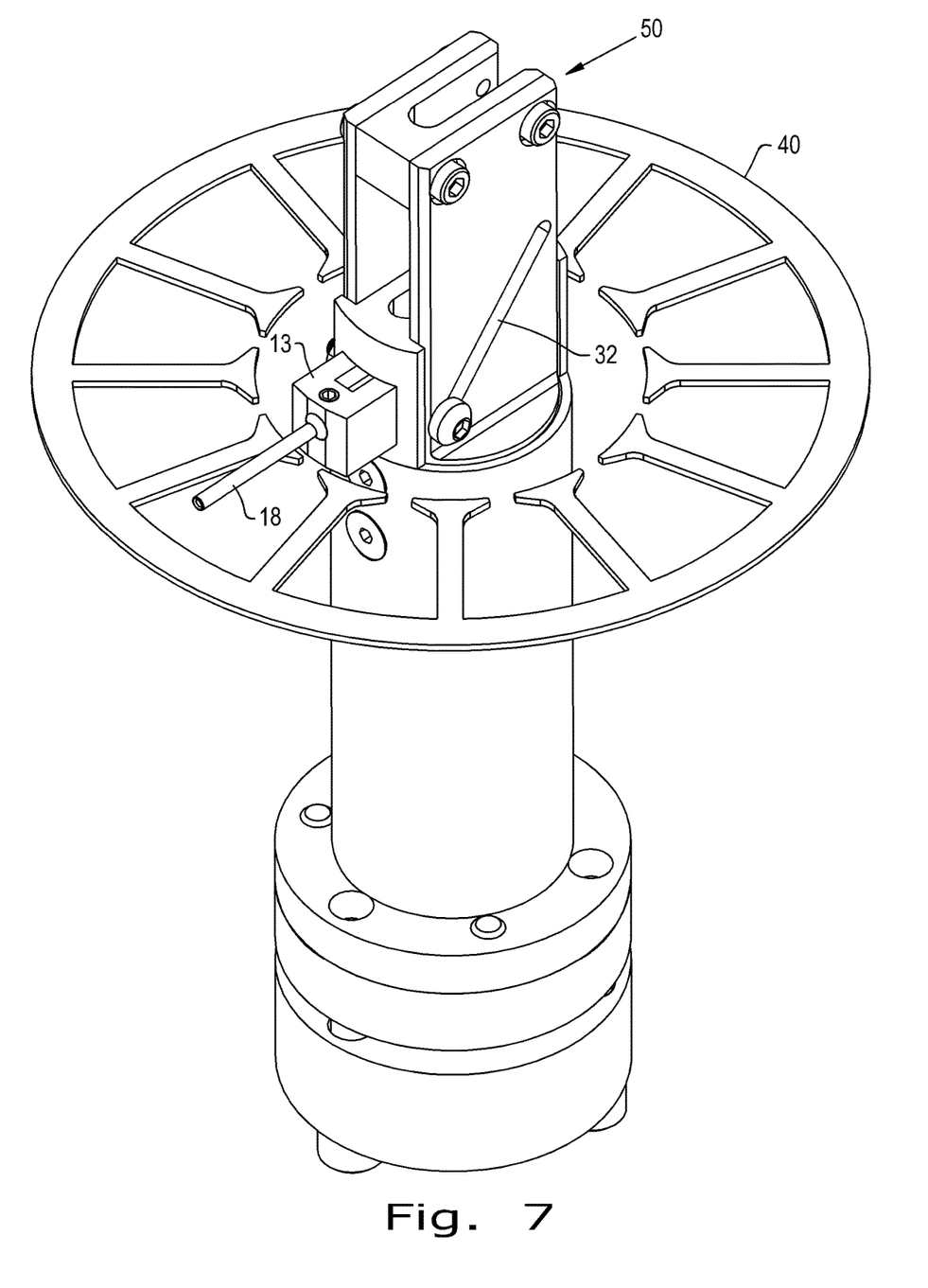
FIG. 7 is another perspective view of the gun head of FIGS. 1-6 again shown in the stator bobbin of FIGS. 4-6 with the needle extended as also shown in FIG. 6.

Now additionally referring to FIGS. 6 and 7 there is respectively shown a top view and a perspective view of gun head 50 relative to the profile of a stator 40, with needle carrier 13 and needle 18 in a fully extended position due to the position of plates 20 and 21. This position would then be the position as wire is wound onto stator 40 at its most outward position. Of course the winding would take place all along the protrusion of stator 40. The range of motion of gun head 50 will allow for the winding of stators with a deeper profile relative to the opening for the rotor than in the prior art.

A coil winding machine 60 for winding conductive wiring to form electrical coils is illustrated schematically. The coil winding machine 60 includes a frame 62 and an extendable rotatable member 64 coupled to frame 62. Wire winding gun head 50 is coupled to and driven by the extendable rotatable member 64 and the coil is wound onto a stator form 40.

Body 19 has a longitudinal axis LA and plates 20 and 21 are a movable element 20 or 21 that are coupled to body 19. The movable elements 20, 21 having a profile 32 in the form of slots 32 therein. Needle 18 is carried by the body 19 by way of a needle carrier 13, and the needle 18 is extendable/retractable dependent upon the profile 32 and a position of the movable element 20, 21, the needle 18 is configured to receive wire and to supply the wire out of an end of needle 18.

Cross bolt 24 extends through the needle carrier and is configured to follow the profile 32, as the movable elements 20, 21 move in a direction parallel to longitudinal axis LA. The cross bolt 24 extends sequentially through plate 20, needle carrier 13 and then plate 21. The slot 32 is illustrated as being substantially linear, but other profiles are also anticipated to control the wiring profile of the gun head 50. Drive screw 17 is rotatable about the longitudinal axis LA and is coupled to the two plates 20 and 21 to drive them in the longitudinal direction thereby extending and retracting needle 18.

Body 19 has a diameter, with the needle 18 being extendable from the body 19 by at least 50% of the diameter of body 19, or at least 55% of the diameter, or by 57% of the diameter.

The winding of a coil onto a stator 40 can be thought of as being accomplished by carrying needle 18 by body 19, with the body 19 extending in a longitudinal direction; and pulling wire through the needle 18 around a portion of the stator 40; and extending and retracting the needle dependent upon the profile of slot 32 in movable element 20, 21 as they move in longitudinal direction LA.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A wire winding gun head for winding conductive wiring to form electrical coils, the wire winding gun head comprising:
   a body having a longitudinal axis;
   a movable element coupled to the body, the movable element having a profile therein, the movable element is movable in a direction parallel to the longitudinal axis; and
   a needle carried by the body, the needle being extendable/retractable dependent upon the profile and a position of the movable element, the needle being configured to receive wire and to supply the wire out of an end of the needle.

2. The wire winding gun head of claim 1, further comprising:
   a needle carrier; and
   a cross bolt, the needle carrier having the needle inserted therein, the cross bolt extending through the needle carrier and being configured to follow the profile.

3. The wire winding gun head of claim 2, wherein the moveable element is two plates each with a slot therein, the cross bolt extending sequentially through one of the plates, the needle carrier and the other plate.

4. The wire winding gun head of claim 3, wherein the slot is substantially linear.

5. The wire winding gun head of claim 4, further comprising a drive screw rotatable about the longitudinal axis, the drive screw being coupled to the two plates.

6. The wire winding gun head of claim 1, wherein the profile is a slot in the movable element.

7. The wire winding gun head of claim 1, wherein the body has a diameter, the needle being extendable from the body at least 50% of the diameter.

8. The wire winding gun head of claim 7, wherein the needle is extendable from the body at least 55% of the diameter.

9. A coil winding machine for winding conductive wiring to form electrical coils, the coil winding machine comprising:
   a frame;
   an extendable rotatable member coupled to the frame; and
   a wire winding gun head coupled to and driven by the extendable rotatable member, the wire winding gun head including:
      a body having a longitudinal axis;
      a movable element coupled to the body, the movable element having a profile therein, the movable element is movable in a direction parallel to the longitudinal axis; and
      a needle carried by the body, the needle being extendable/retractable dependent upon the profile and a position of the movable element, the needle being configured to receive wire and to supply the wire out of an end of the needle.

10. The coil winding machine of claim 9, wherein the wire winding gun head further comprises:
    a needle carrier; and
    a cross bolt, the needle carrier having the needle inserted therein, the cross bolt extending through the needle carrier and being configured to follow the profile.

11. The coil winding machine of claim 10, wherein the moveable element is two plates each with a slot therein, the cross bolt extending sequentially through one of the plates, the needle carrier and the other plate.

12. The coil winding machine of claim 11, wherein the slot is substantially linear.

13. The coil winding machine of claim 12, wherein the wire winding gun head further comprises a drive screw rotatable about the longitudinal axis, the drive screw being coupled to the two plates.

14. The coil winding machine of claim 9, wherein the profile is a slot in the movable element.

15. The coil winding machine of claim 9, wherein the body has a diameter, the needle being extendable from the body at least 50% of the diameter.

16. The coil winding machine of claim 15, wherein the needle is extendable from the body at least 55% of the diameter.

17. A method of winding a coil onto a stator, the method comprising the steps of:
    carrying a needle by a body of a wire winding gun head, the body extending in a longitudinal direction;
    pulling wire through the needle around a portion of the stator; and
    extending or retracting the needle dependent upon a profile slot in a movable element, the needle maintaining a substantially constant orientation to the longitudinal direction of the body, the movable element being movable in the longitudinal direction.

18. The method of claim 17, wherein the body has a diameter value, the needle being extendable from the body by at least 50% of the diameter value.

\* \* \* \* \*